J. R. SNYDER.
TRIPLE VALVE.
APPLICATION FILED AUG. 27, 1912.
1,097,061.
Patented May 19, 1914.
2 SHEETS—SHEET 1.
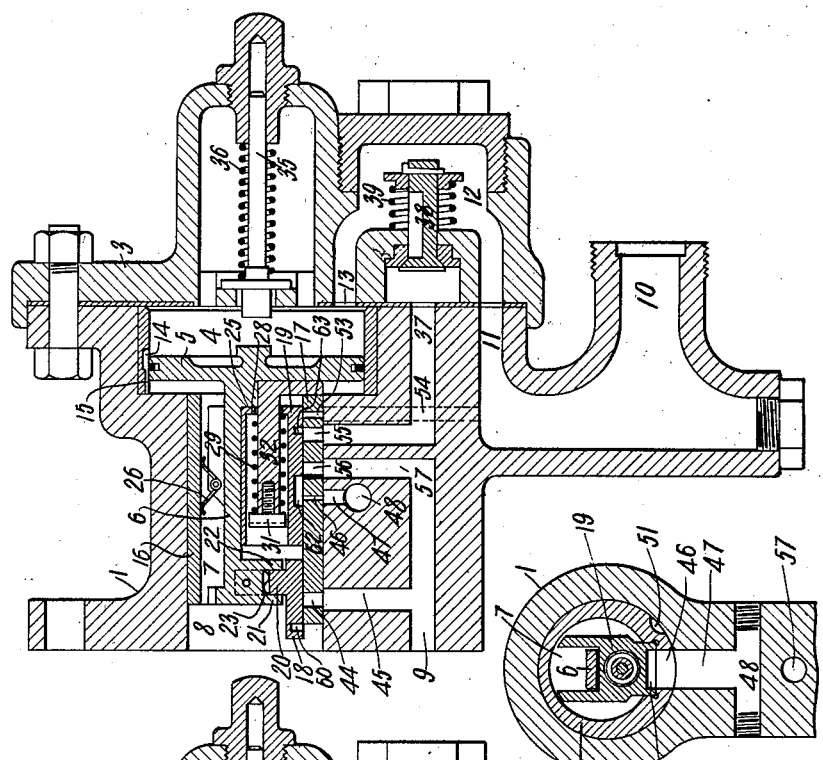
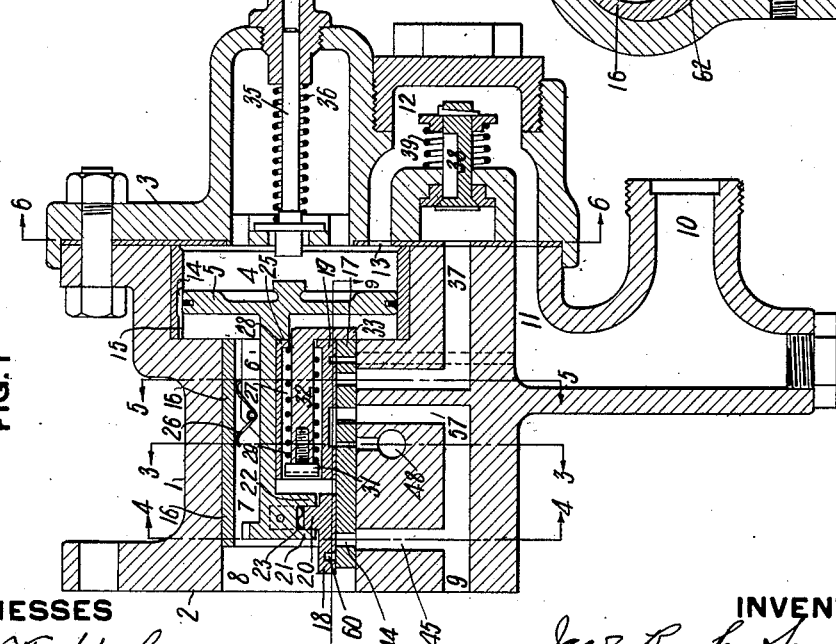
WITNESSES
INVENTOR
Jacob Rush Snyder,
By Fred'k W. Winter
Attorney

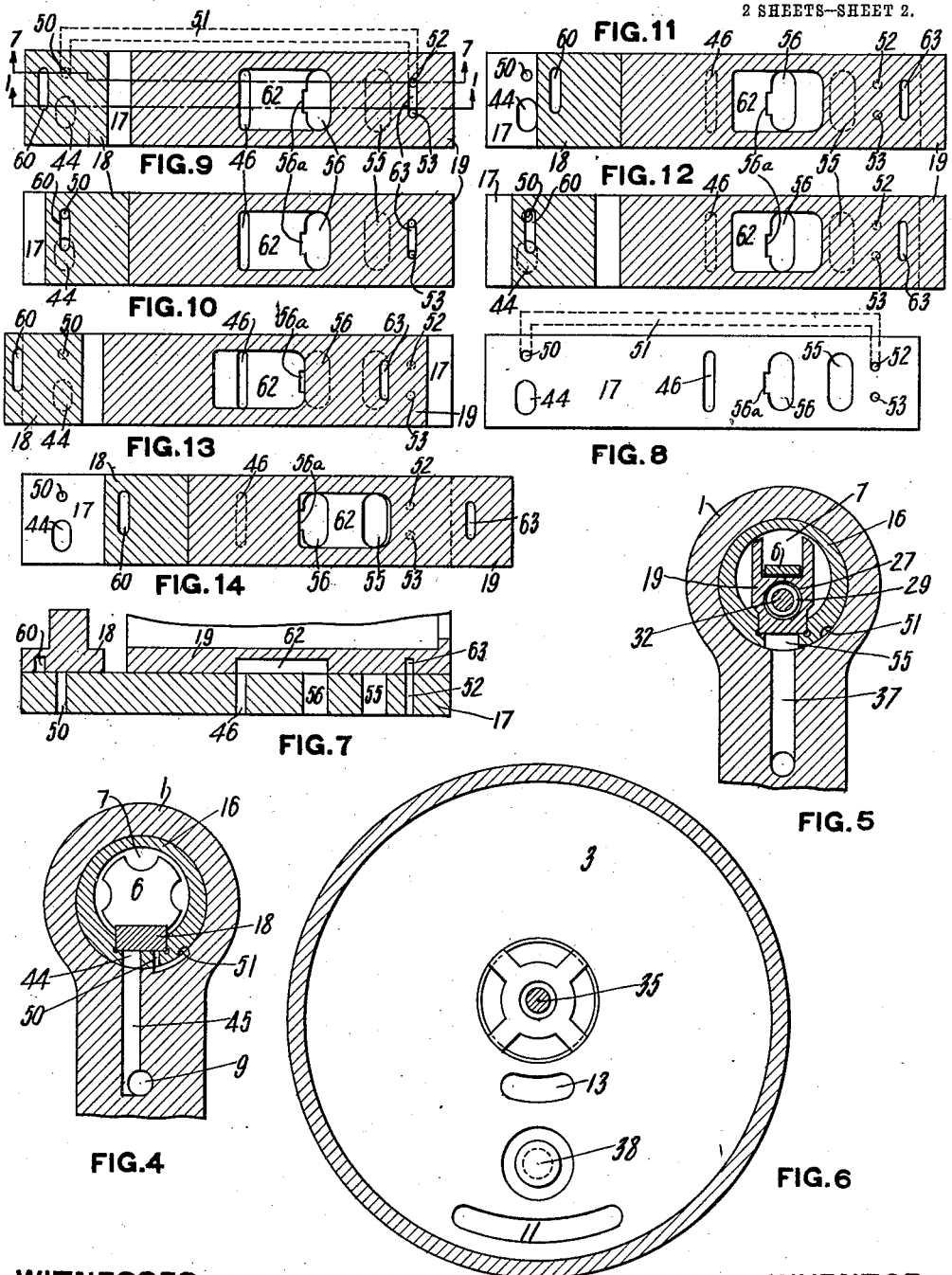

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE.

1,097,061. Specification of Letters Patent. Patented May 19, 1914.

Application filed August 27, 1912. Serial No. 717,366.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and more particularly to triple valves for use on freight trains.

The object of the invention is to provide a triple valve which effects and performs all of the usual functions and results of modern freight triple valves, and which performs and effects such functions and results by much simpler and less complicated mechanical means than are embodied in prior types of freight triple valves capable of effecting the same results and functions.

The invention comprises the construction and arrangement of parts of a triple valve hereinafter described and claimed.

In the accompanying drawings, Figures 1 and 2 are longitudinal sections through a triple valve embodying the invention taken substantially on the line 1—1, Fig. 9, Fig. 1 showing the same in full release or running position and Fig. 2 showing the same in retarded release and restricted recharging position; Figs. 3, 4, 5 and 6 are vertical transverse sections taken respectively on the lines 3—3, 4—4, 5—5 and 6—6 on Fig. 1; Fig. 7 is a vertical longitudinal section through the valve seat and slide valves taken on the line 7—7, Fig. 9; Fig. 8 is a plan view of the slide valve seat; and Figs. 9, 10, 11, 12, 13 and 14 are diagrammatic views of the valve seat in plan and the valves in horizontal section on the line 9—9, Fig. 1, and showing different positions of the valve, Fig. 9 showing the same in full release position, Fig. 10 in quick service or quick serial application position, Fig. 11 in full service position, Fig. 12 in service lap position, Fig. 13 in retarded release and restricted recharging position, and Fig. 14 in emergency application position.

The valve in its general form, construction and arrangement follows the standard type of Westinghouse and similar valves. It comprises a casing 1 provided at one end with a flat face 2 for connection to the auxiliary reservoir and brake cylinder, and closed at its opposite end by the cap or head 3 secured to the casing by compression bolts, all as is usual in standard triple valves. In the casing is the usual chamber 4 in which works a piston 5 provided with a stem 6 extending into the bore 7 of the casing and actuating the slide valves. The auxiliary reservoir connection is at 8 and the brake cylinder connection at 9. The train or brake pipe connection 10 communicates through passage 11 with a chamber 12 in the head or cap 3, which chamber communicates at 13 with the piston chamber 4. The bushing of chamber 4 is provided with an auxiliary reservoir charging groove, or grooves, which is shown as a single groove formed with portions of different sizes, to-wit: a relatively large portion 14 which is opposite the main piston 5 when the latter is in full release or running position shown in Fig. 1, and a more restricted portion 15 inwardly from said portion 14 and which is opposite the piston 5 when the latter is moved to retarded release and restricted recharging position, shown in Fig. 2.

In the bore 7 of the valve is a suitable bushing 16 whose lower portion forms a valve seat 17 with which coöperate a pair of valves, to-wit: a relatively small valve 18 and a larger valve 19. The valve 18 is provided with an upwardly projecting portion 20 which fits between an end projection 21 and intermediate projection 22 on the piston stem 6 and entirely fills the space between said projections so that it moves at all times with the piston 5. It is held to the seat by spring 23 interposed between the projection 20 and the bottom of the recess into which said projecting portion extends. The larger slide valve 19 is held between the intermediate projection 22 and a shoulder 25 on the piston stem, but does not fill the space between said projection and shoulder so that there is a certain amount of lost motion which permits the piston 5 and valve 18 to move at times without moving the valve 19. The valve 19 is held to the seat 17 by the usual spring 26.

Valve 19 is provided with a longitudinal bore 27 provided at its outer end with a shoulder 28. In said bore is a helical spring 29 seated at one end against shoulder 28 and at its opposite end against head 31 screwed into stem 32 which extends through said spring and beyond the outer end of the slide valve and its outer end is provided with a downturned portion 33 adapted in the release position of the valve to contact with the end of the valve seat 17, as shown in Fig. 1, so that further movement of the piston and valve toward the left, when the valve is forced to retarded release and restricted recharging position, compresses the spring 29, as shown in Fig. 2, and when the pressures on opposite sides of the piston 5 equalize, said spring returns the valves and piston to normal or running position, shown in Fig. 1.

In the head or cap 3 is the usual graduating stem 35 and spring 36 which act in the usual manner to graduate the movement of the piston 5 to service and emergency positions. From the chamber 12 in the head or cap 3 a passage 37 leads to the valve seat 17, and said passage is controlled by a check valve 38 seated by a spring 39 toward the train pipe.

The valve seat 17 is provided with ports and passages, shown in Figs. 1, 2, 7 and 8, as follows:—a port 44 near the inner end of the seat and communicating with passage 45 in the casing leading to the brake cylinder connection 9; a port 46 located midway of the length of the valve seat and communicating through the passage 47 with the transverse port 48 leading to the atmosphere; a small port 50 in proximity to brake cylinder port 44 and communicating through groove 51 cut in the outer face of the bushing 16 with a port 52 located near the outer end of the seat 17; a port 53 transversely in line with port 52 and communicating through passage 54 with train pipe passage 11; a port 55 communicating with the train pipe passage 37; and a port 56 communicating through passage 57 with the brake cylinder connection 9.

The small slide valve 18 is of rectangular shape and is provided in its bottom face with a single narrow transverse cavity 60 whose function, when the valve is in quick service position, is to connect port 50 with brake cylinder port 44, so as to admit train pipe air to the brake cylinder. The larger slide valve 19 is of rectangular form, and in its bottom face is provided with a pair of cavities, to-wit: a relatively large cavity 62 and a smaller transverse cavity 63 located outwardly relative to cavity 62.

The valve described has six positions, as follows:

1. *Full release and recharging position.* (Shown in Figs. 1, 7 and 9.)—In this position the downward projection 33 of the spring stem 32 bears against one end of valve seat 17 so that spring 29 resists the further movement of the piston and valves toward the left, viewing Fig. 1. The piston 5 is opposite the large recharging groove 14 so that train pipe air passes from chamber 4 to the auxiliary reservoir and quickly recharges the latter. The slide valves 18 and 19 are in such position, shown in Fig. 9, that cavity 62 in slide valve 19 connects brake cylinder port 56 with exhaust port 46. Consequently, the brake cylinder pressure is released to the atmosphere. All other ports are blanked, although cavity 63 connects train pipe port 53 with port 52, but as port 50 is blanked by valve 18 no effect is produced. This position is assumed in normal running and after equalization of auxiliary reservoir and train pipe pressures, and permits the full and rapid release of the brakes and the rapid recharging of the auxiliary reservoir.

2. *Quick service or serial venting position.* (Shown in Fig. 10.)—This position is assumed upon a slight reduction of train pipe pressure and upon the first movement of the piston 5, which results in moving the small slide valve 18 but without moving the large valve 19 due to lost motion connection between the latter and the piston stem. In this position the cavity 60 of valve 18 connects brake cylinder port 44 with the small port 50, and as ports 52 and 53 are still connected by cavity 63 in the large slide valve 19, train pipe air passes from port 53 to the brake cylinder port 44, thereby momentarily venting the train pipe into the brake cylinder to produce a drop in pressure in the train pipe at the car and secure a quicker serial action of the brakes throughout the train than would be possible if all the air had to flow forwardly and out at the engineer's brake valve. The valve remains in this position for an appreciable time, due to the fact that the first movement of the piston 5 moves only the small valve 18, but as soon as the lost motion between the piston stem 6 and valve 19 is taken up the greater frictional resistance then encountered checks the movement of the piston and provides an appreciable time for venting the train pipe into the brake cylinder. The reduction of train pipe pressure caused by this venting unbalances the pressures on opposite sides of piston 5 sufficiently to overcome the frictional resistance of both slide valves so that the latter almost immediately move to the next position now to be described.

3. *Full service position.* (Shown in Fig. 11.)—In this position, the slide valves have moved to the right sufficiently so that the connection between brake cylinder port 56 and exhaust port 46 and between brake cylinder port 44 and port 50 are broken, and also so that valve 18 uncovers brake cylinder port 44, thereby allowing auxiliary reservoir pressure to rush into the brake cylinder. All other ports are blanked. In this position, the head of piston 5 is in contact with graduating stem 35, graduating spring 36 checking the movement of the piston to stop the valves in service position.

*4. Service lap position.* (Shown in Fig. 12.)—This position is assumed by the valve on the slight recoil such as occurs immediately after a service application, due to a momentary excess of pressure on the train pipe side of the piston 5. The large slide valve 19 remains stationary, due to the lost motion connection between itself and the piston stem, but the small slide valve 18 is moved inwardly sufficiently to blank the brake cylinder port 44, thereby cutting off the further flow of air from the auxiliary reservoir to the brake cylinder, but maintaining the pressure already in the brake cylinder. All other ports remain blanked.

*5. Retarded release and restricted recharging position.* (Shown in Figs. 2 and 13.)—This position is reached after an application of the brakes by quickly charging the train pipe and increasing the pressure therein so rapidly that it cannot equalize through the charging groove 14. This results in forcing the piston 5 entirely over to the left and brings it opposite the restricted recharging groove 15 so that flow of train pipe air into the auxiliary reservoir is restricted, preventing the auxiliary reservoirs on the forward end of a long train from robbing the train pipe excessively and leaving sufficient pressure to flow toward the rear end of the train so as to secure the release of the brakes at the rear end substantially simultaneously with those at the forward end. This position of the valve is assumed only on the forward portion of the train, while at the rear end of the train the train pipe pressure is sufficiently low (due to feeding the reservoirs forward thereof) that the triple valves merely go to full release position, shown in Fig. 1, being prevented from going farther by the spring 29 on stem 32 whose downturned portion 33 contacts with the end of valve seat 17. At the forward end of the train where the pistons have been driven fully over to the left, the springs 29 are under compression so that upon equalization of pressure on opposite sides of the pistons 5 the springs 29 return the pistons and valves to full release position. In this position the cavity 62 in slide valve 19 overlaps the extension 56ᵃ of brake cylinder port 56 and connects the same with exhaust port 46. Consequently, the pressure in the brake cylinders is released more slowly than in full service position, which is just what is needed at the forward end of the train to retard the release of the brakes thereat and secure substantially simultaneous release from end to end of the train.

*6. Emergency application position.* (Shown in Fig. 14.)—This position is assumed upon a large reduction of train pipe pressure, so that auxiliary reservoir pressure pushes piston 5 entirely over to the right and compresses graduating spring 36. In this position the slide valves have moved so as to fully uncover brake cylinder port 44 and permit auxiliary reservoir pressure to rush into the brake cylinder, the same as in full service position. In addition, the cavity 62 of valve 19 connects train pipe port 55 with brake cylinder port 56, thereby permitting train pipe pressure to flow from passage 11 and chamber 12 through passage 37 directly to the brake cylinder, lifting the check valve 38 in its course. Consequently, the brake cylinder is supplied wtih air from both the auxiliary reservoir and the train pipe to secure a strong application of the brakes and also secure a quick serial action of the brakes throughout the train by the reduction of train pipe pressure at each car. As soon as brake cylinder pressure balances train pipe pressure, check valve 38 closes and thereafter the application is completed by the equalization of auxiliary reservoir pressure into the brake cylinder. The emergency position of the valve can be secured either directly from the full release position or from any of the other positions of the valve by merely reducing the train pipe pressure below the point of equalization of auxiliary reservoir pressure in the brake cylinder.

The stem 35 and spring 36 act in the usual manner of graduating stems and springs. The spring 29 on stem 32 becomes active only upon movement of the piston and valves inwardly from the normal or full release position, thereby serving as a graduating stop to prevent movement of the main piston inwardly beyond its normal position, except when purposely intended by a sudden increase of train pipe pressure. It also serves as a means for automatically reposition from retarded release and restricted turning the slide valves and piston to normal recharging position, upon equalization of pressure on opposite sides of piston 5.

The valve described has all of the usual functions of triple valves, including quick service or serial venting position to secure a rapid serial action of the brakes throughout the train in service applications, and also providing for a retarded release of the brakes and restricted recharging of the auxiliary reservoirs as above described, in addition to the usual service and application positions, as well as enabling the brakes to be held in any of the positions by lapping the valve. The valve, therefore, performs all of the functions of the most approved triple valves, but by a mechanical construction much simpler and less complicated than existing valves and appurtenances which perform all of the functions which this valve performs. Consequently, the valve is not only cheaper as to first cost, but is more reliable in action, less liable to get out of order, cheaper in its upkeep, and offers less resistance to movement than similar valves for securing the same functional effects.

What I claim is:—

1. A triple valve having connections to the train pipe, brake cylinder, auxiliary reservoir and the atmosphere, a movable abutment actuated by variations in train pipe pressure, a valve seat provided with ports communicating respectively with the train pipe and brake cylinder connections, a valve device comprising a pair of valves coöperating with said seat and having movement relative to one another and actuated by said movable abutment, said valve seat and valves being arranged in service position to connect the auxiliary reservoir to a brake cylinder port in the valve seat and in emergency position to connect the auxiliary reservoir to a brake cylinder port and the train pipe port to a brake cylinder port, and a spring controlling the movement of said valve device to service and to emergency positions.

2. A triple valve having connections to the train pipe, brake cylinder, auxiliary reservoir and the atmosphere, a movable abutment actuated by variations in train pipe pressure, a valve seat provided with ports communicating respectively with the train pipe and the brake cylinder connections, and a valve device comprising a pair of valves coöperating with said seat and having movement relative to one another and actuated by said movable abutment, said valve seat and valve device being provided with ports and passages arranged in service position to connect the auxiliary reservoir to the brake cylinder and in emergency position to connect the auxiliary reservoir to the brake cylinder and the train pipe to the brake cylinder, said valve mechanism also controlling the brake cylinder exhaust and having a normal open position for said exhaust and another position for partially opening the exhaust.

3. A triple valve having connections to the train pipe, brake cylinder, auxiliary reservoir and the atmosphere, a movable abutment actuated by variations in train pipe pressure, a valve seat provided with ports communicating respectively with the train pipe and the brake cylinder connections, a valve device comprising a pair of valves coöperating with said seat and having movement relative to one another and actuated by said movable abutment, said valve seat and valve device being provided with ports and passages arranged in service position to connect the auxiliary reservoir to the brake cylinder and in emergency position to connect the auxiliary reservoir to the brake cylinder and the train pipe to the brake cylinder, said valve device also controlling the brake cylinder exhaust and having a normal open position for said exhaust and another position for partially opening the exhaust, and yielding means for restoring said valve device from the retarded release position to the normal open release position.

4. A triple valve having connections to the train pipe, brake cylinder, auxiliary reservoir and the atmosphere, a movable abutment actuated by variations in train pipe pressure, a valve seat, a valve device comprising a pair of valves coöperating with said valve seat and having movement relative and one another and actuated by said movable abutment, said valve seat and valve device being provided with ports and passages arranged in service position to connect the auxiliary reservoir to the brake cylinder and in emergency position to connect the auxiliary reservoir to the brake cylinder and the train pipe to the brake cylinder, said valve device also controlling the brake cylinder exhaust and having a normal open position for said exhaust and another position for partially opening the exhaust, and a spring device carried by said valve device for restoring the same from retarded release position to open release position.

5. A triple valve comprising a casing having connections to the train pipe and the auxiliary reservoir, a valve seat in said casing provided with ports connected with the brake cylinder, the train pipe and the atmosphere, a movable abutment in said casing actuated by variations in train pipe pressure, a pair of valves coöperating with said seat and actuated by said movable abutment and having relative movement one to the other, one of said valves being arranged in service and emergency positions to connect the auxiliary reservoir to the brake cylinder, and the other of said valves being arranged in full release position to connect the brake cylinder port with the exhaust port and upon movement by increase of train pipe pressure from full release position to partially connect the brake cylinder port with the exhaust port.

6. A triple valve comprising a casing having connections to the train pipe and auxiliary reservoir, a valve seat therein provided with an exhaust port, a train pipe port, and a pair of brake cylinder ports, a movable abutment in said casing actuated by variations in train pipe pressure, and a pair of valves actuated by said movable abutment and having relative movement one to the other and coöperating with said seat, one of said valves being arranged in service position to connect one of said brake cylinder ports with the auxiliary reservoir and the other of said valves being arranged in emergency position to connect the train pipe port with the other of said brake cylinder ports, in full release position to connect the brake cylinder port with the exhaust port and upon movement by increase of train pipe pressure from full release position to partially connect the brake cylinder port.

7. A triple valve comprising a casing having connections to the train pipe and auxiliary reservoir, a valve seat therein provided with an exhaust port, a train pipe port, and a pair of brake cylinder ports, a movable abutment in said casing actuated by variations in train pipe pressure, a pair of valves actuated by said movable abutment and having relative movement one to the other and coöperating with said seat, one of said valves being arranged in service position to connect one of said brake cylinder ports with the auxiliary reservoir and the other of said valves being arranged in emergency position to connect the train pipe port with the other of said brake cylinder ports, in full release position to connect the brake cylinder port with the exhaust port and upon movement by increase of train pipe pressure from full release position to partially connect the brake cylinder port with the exhaust port, and yielding means for restoring said valve from the last named position to the full release position.

8. A triple valve including a valve seat provided with a pair of ports communicating with the brake cylinder, an exhaust port, a large train pipe port, a small train pipe port, a pair of connected small ports, one located in proximity to the small train pipe port and the other in proximity to one of the brake cylinder ports, and a pair of valves coöperating with said seat and having relative movement one to another, one of said slide valves being provided with a cavity arranged in quick service position to connect a brake cylinder port with one of said small ports, and the other of said slide valves being provided with a cavity arranged in quick service position to connect the small train pipe port with the other of said small ports, and with another cavity arranged in emergency position to connect the large train pipe port with the other brake cylinder port and in release position to connect said brake cylinder port with the exhaust port.

9. A triple valve device consisting of a casing containing a valve mechanism comprising a main slide valve for controlling the exhaust from the brake cylinder, an auxiliary valve having a movement relative to said main valve for controlling the supply of air from the auxiliary reservoir to the brake cylinder in service applications of the brakes, a piston subject to variations in brake pipe pressure for operating said valves, and a yielding resistance means carried by the main slide valve and coöperating with a stationary part of the valve device for returning said main valve and piston from a position in which the flow of air from the brake cylinder through the exhaust port is restricted to the normal full release position.

10. A triple valve device comprising a casing containing a valve for controlling the brake cylinder exhaust and having a full release position and a retarded release position, a piston subject to brake pipe pressure for actuating said valve, and a spring device carried by said valve and arranged to contact with a stationary part of the valve device and acting to return the valve from the retarded release position to the full release position.

In testimony whereof, I have hereunto set my hand.

JACOB RUSH SNYDER.

Witnesses:
MARY E. CAHOON,
I. C. STAVER.

---

Copies of this patent may be obtained for five cents each, by addressing the "Commissioner of Patents, Washington, D. C."